Dec. 3, 1929.  L. M. RIDDLES  1,738,206
AUTOMATIC CONTROL FOR ELECTRIC LIGHT CIRCUITS
Filed May 27, 1927  2 Sheets-Sheet 1
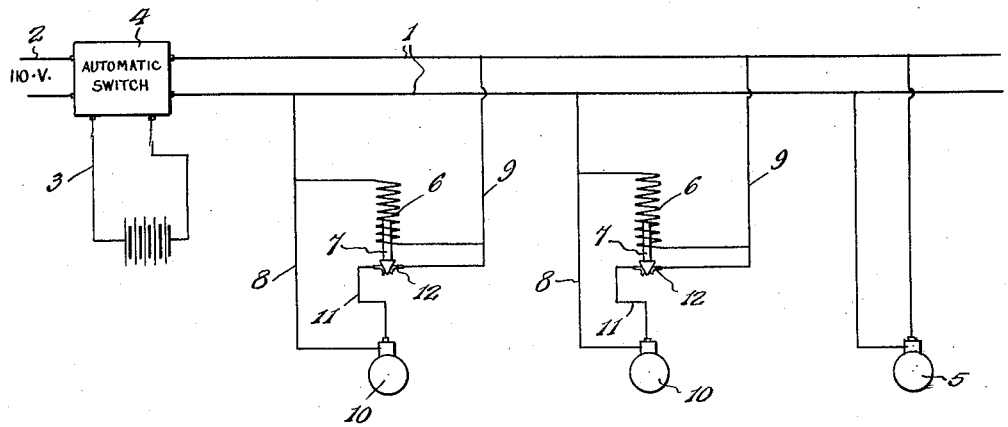
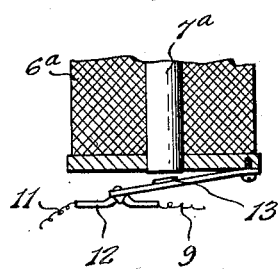
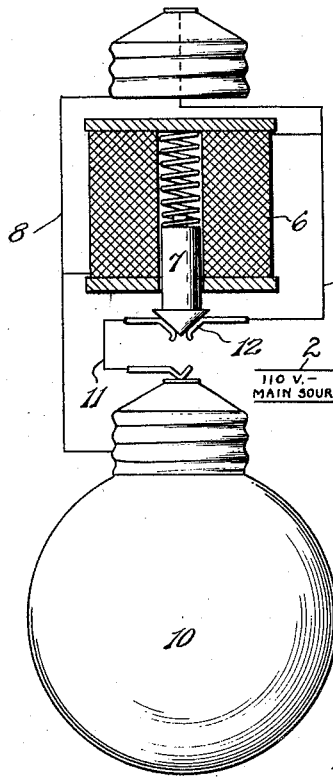
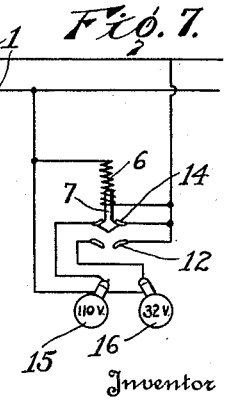
Inventor
Leo M. Riddles.
By Lacey & Lacey, Attorneys Dec. 3, 1929.  L. M. RIDDLES  1,738,206
AUTOMATIC CONTROL FOR ELECTRIC LIGHT CIRCUITS
Filed May 27, 1927  2 Sheets-Sheet 2
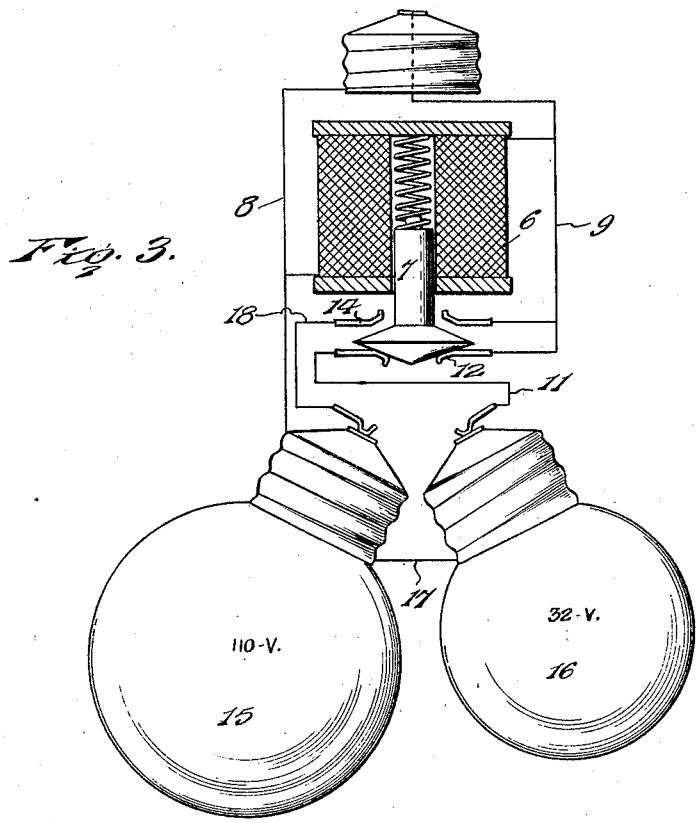
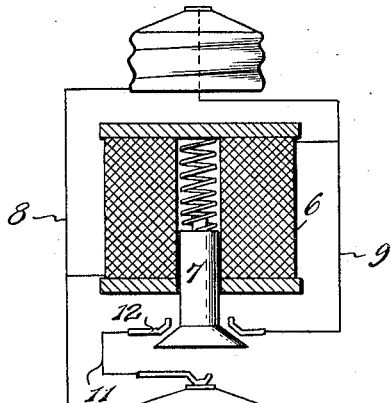
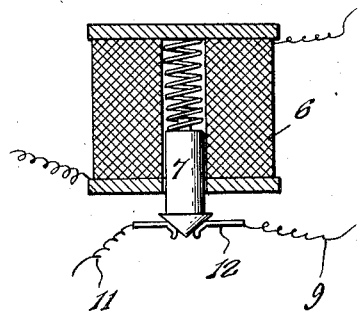
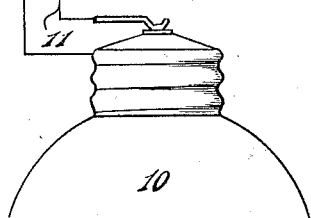
Inventor
Leo M. Riddles.
By Lacey & Lacey, Attorneys Patented Dec. 3, 1929

1,738,206

UNITED STATES PATENT OFFICE

LEO M. RIDDLES, OF JOHNSTOWN, PENNSYLVANIA

AUTOMATIC CONTROL FOR ELECTRIC-LIGHT CIRCUITS

Application filed May 27, 1927. Serial No. 194,819.

The primary intention of this invention is the provision of means for automatically controlling the current to the lamps of a circuit, singly or in groups, according to the wiring, so that in an emergency all the lamps, except those desired to burn, will have the current cut off therefrom.

One of the principal advantages of the invention is the reduction in the cost of installation of emergency lighting systems since it obviates the necessity of cutting into floors and walls in order to split off certain lights that are required to be lit in an emergency when the normal circuit is cut off for any cause.

The invention is designed for emergency lighting systems wherein the feed or distributing wires are adapted to be supplied with different types of current, such as alternating current or direct current, or like current of different voltage, so that when the normal, or main current, becomes crippled and the emergency, or auxiliary current is automatically cut into the feed or distributing wires, such emergency current will be cut off from the lamps except the one or more lamps required to remain lit in an emergency.

While the drawings illustrate a preferred embodiment of the invention, it is to be understood that in adapting the means to meet specific needs and requirements, the design may be varied, and changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a diagrammatic view illustrative of an embodiment of the invention.

Figure 2 is an enlarged detail view of one form of the invention.

Figure 3 is a view, similar to Figure 2, showing a modification.

Figure 4 shows a further modification.

Figure 5 is a view of a cut-out adapted for controlling a plurality of lamps.

Figure 6 is a detail view of a further modification.

Figure 7 is a diagram of a system including the form of the invention shown in Figure 3.

Corresponding and like parts are referred to in the following description and designated in the several views of the drawings by like reference characters.

The numeral 1 designates the distributing wires by means of which the lamps of a building or like structure are supplied with current from a suitable source in a manner well understood. The numeral 2 designates the feed wires leading from the source of supply. The emergency or auxiliary circuit is indicated by the numeral 3. A throw-over switch 4 of any well known construction has the several wires 1, 2 and 3 connected thereto and under normal conditions the emergency or auxiliary circuit 3 is cut out and the current from the feed line 2 flows to the distributing line 1, and to the lamps connected thereto. However, should the current from the main source fail through any cause, the switch 4 automatically cuts the emergency or auxiliary circuit 3 into action so that the distributing line 1 is supplied with current from the emergency circuit.

In accordance with the present invention certain lamps are provided with a switch or control mechanism whereby they are automatically cut out of circuit, so as not to be affected by the current supplied by the emergency circuit, with the result that the lamp or lamps required to remain lit are kept burning by the current supplied by means of the emergency or auxiliary circuit. In the diagram illustrated in Figure 1, the numeral 5 designates a lamp required to be kept lit, either by the current from the main source of supply or by the current derived from the emergency or auxiliary circuit. The lamp 5 may be of any type or make and is connected to the distributing line 1 of the house wiring in any usual or preferred way. While one lamp is shown it is to be understood that any number may be provided according to the number of lights to be kept lit in an emergency.

The control or switch includes an electromagnet which may be of the solenoid type or of the ordinary type having a fixed core and a movable armature, as indicated most clearly in Figure 6 of the drawings. An essential feature resides in the fact that the electro-magnet is not affected by one type or potential current, but is affected by a different type or potential current. In view of this fact all the lamps will be lit when the current from the main source of supply is flowing therethrough, but should the main current become interrupted or inadequate for the purpose, the emergency or auxiliary circuit is brought into action and all the lamps, with the exception of the one or more intended to remain lit, will be automatically cut out of circuit, so that the current from the emergency circuit will be utilized only to keep the emergency lights burning.

Referring to Figure 2 of the drawings, the helix or winding of the electro-magnet is designated by the numeral 6 and the core by the numeral 7. The core 7 is spring actuated and normally closes a circuit represented by the wires 8 and 9. The winding or helix 6 is shunted into the circuit including the wires 8 and 9, and is not affected by the normal current, and in consequence, the core 7 closes the circuit through the lamp 10. This circuit includes a wire 11 and spaced contacts 12 which are normally bridged by the core 7. When the normal circuit fails and the emergency or auxiliary circuit 3 is brought into action, the current supplied thereby flowing through the helix or winding 6 energizes the same and attracts the core 7 and breaks the circuit through the lamp 10, which is automatically cut out of action.

In the modification shown in Figure 4 the arrangement is substantially the same as illustrated in Figure 2, the difference residing in the fact that the electro-magnet is energized by the normal or main current, thereby attracting the core 7 and maintaining a closed circuit through the lamps. Should the normal or main current fail to properly function the helix or winding 6 of the electro-magnet will become deenergized and the core 7 being no longer attracted drops and breaks the circuit through the lamps.

Figure 5 illustrates a form of switch or control adapted for an electrolier or group of lamps, and is adapted to be interposed in the circuit whereby in an emergency the series of lamps are automatically cut out of circuit, so as not to be affected by the current of the auxiliary circuit which has been brought into action when the main current has failed from any cause.

In the modification shown in Figures 6 the core 7ª is fixed in the helix or winding 6ª, which, when energized, induces a magnetic action in the core 7ª whereby an armature 13 is attracted, thereby breaking the circuit to the lamp, not shown, supplied with current through the wires 9 and 11 in the manner herein indicated.

In the modification illustrated in Figure 3, two lamps 15 and 16 are shown, and are adapted to operate by current of different voltage. The collars or bases of the lamps 15 and 16 are electrically connected, as indicated at 17, hence one side of each circuit is common to the collars or bases of both lamps. In addition to the spaced contacts 12, other spaced contacts 14 are provided and one of these contacts is electrically connected to the wire 9, and the other contact is electrically connected by means of a wire 18 to the center terminal of the lamp 15. Under normal conditions the main current flows through the lamp 15 having the higher voltage, the winding 6 being energized and the armature therefor held against the contacts 14. In an emergency resulting in failure of the main current, the emergency circuit is not strong enough to cause the winding to attract the armature which consequently drops to the contacts 12, thereby breaking the circuit through the lamp 15 and closing the circuit through the lower voltage lamp 16.

It will be understood from the foregoing that emergency lighting systems may be installed without necessitating the cutting through floors, walls, and the like, and in consequence, the work is simplified, and the cost reduced to a minimum amount. Moreover, any lighting system may be readily converted into an emergency system by providing a local or emergency circuit and supplying a throw-over switch, whereby to automatically bring the emergency circuit into action when the main circuit fails to function.

It is observed that while the invention is primarily intended for emergency lighting systems, it is susceptible of ready adaptation to a system including a plurality of motors, or other electrically operated devices, thereby enabling certain motors or devices to be cut out of circuit to the exclusion of others, which may be required to be kept running when the current from a main source of supply fails, or becomes impaired, and the current from an emergency circuit is brought into action.

Having thus described the invention, I claim:

1. In an emergency lighting system including a distributing circuit, a main supply circuit and an auxiliary supply circuit and a throw-over switch for automatically cutting out the main circuit when failing to properly function and cutting in the auxiliary circuit, a control in the distributing circuit including a switch and an electro-magnet which is adapted to be affected by the current derived from either the main or auiliary circuit, but which is unaffected by the current derived from the other one of said circuits, with the result that in an emergency the current is supplied solely to the lamp to be lighted and is cut off from the other lamps of the system.

2. In an emergency lighting system including main and auxiliary supply circuits, a distributing circuit, and a throw-over switch for cutting out the main circuit and cutting in the auxiliary circuit in an emergency, service and emergency lamps in the distributing circuit, and an automatic control for cutting out the service lamp when the main current fails, said control including a switch and an electromagnet, the latter being affected by one type or potential of current, and unaffected by a different type of current or potential.

3. An emergency light including two lamps adapted for current of different potentials, a switch for each of the lamps, and an electromagnet for controlling the switches and adapted to be actuated by a current of a given potential and to be unaffected by a current of a different potential, whereby under normal conditions, one of the lamps is adapted to be lighted, and in an emergency the second lamp is lighted and the current to the first mentioned lamp automatically cut off.

In testimony whereof I affix my signature.

LEO M. RIDDLES. [L. S.]